No. 625,973. Patented May 30, 1899.
A. T. HAGEN & D. M. COOPER.
STARCHING MACHINE.
(Application filed Nov. 7, 1898.)
(No Model.) 5 Sheets—Sheet 1.

Witnesses.
Thomas Durant
E. Griffith

Inventors,
Arthur T. Hagen
Daniel M. Cooper
by Church & Church
their Attorneys.

No. 625,973. Patented May 30, 1899.
A. T. HAGEN & D. M. COOPER.
STARCHING MACHINE.
(Application filed Nov. 7, 1898.)
(No Model.) 5 Sheets—Sheet 2.

Witnesses.
Thomas Durant.
E. Griffet

Inventors.
Arthur T. Hagen and
Daniel M. Cooper.
by Church & Church
their Attorneys.

No. 625,973. Patented May 30, 1899.
T. HAGEN & D. M. COOPER.
STARCHING MACHINE.
(Application filed Nov. 7, 1898.)
(No Model.) 5 Sheets—Sheet 3.
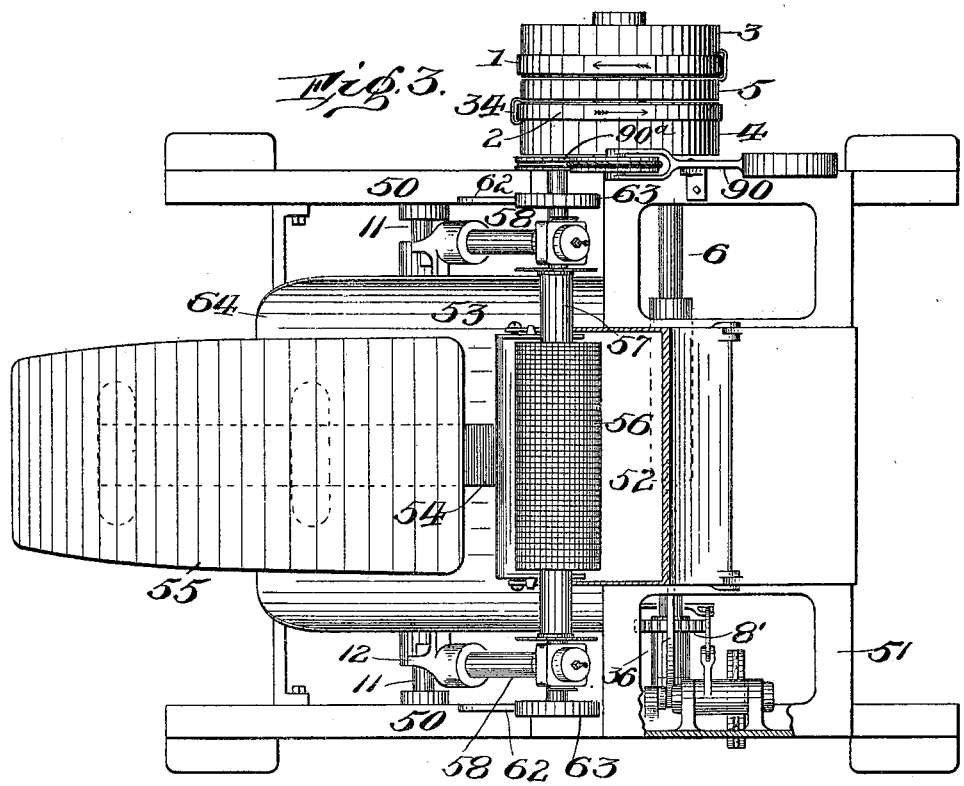
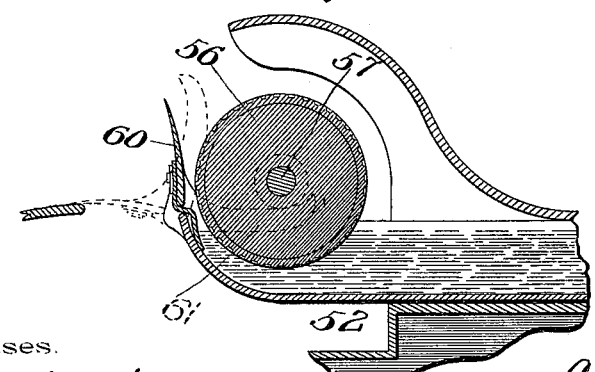
Witnesses.
Thomas Durant
E Griffith
Inventors.
Arthur T. Hagen and
Daniel M. Cooper
By Church & Church
their Attorneys No. 625,973. Patented May 30, 1899.
A. T. HAGEN & D. M. COOPER.
STARCHING MACHINE.
(Application filed Nov. 7, 1898.)
(No Model.) 5 Sheets—Sheet 4.
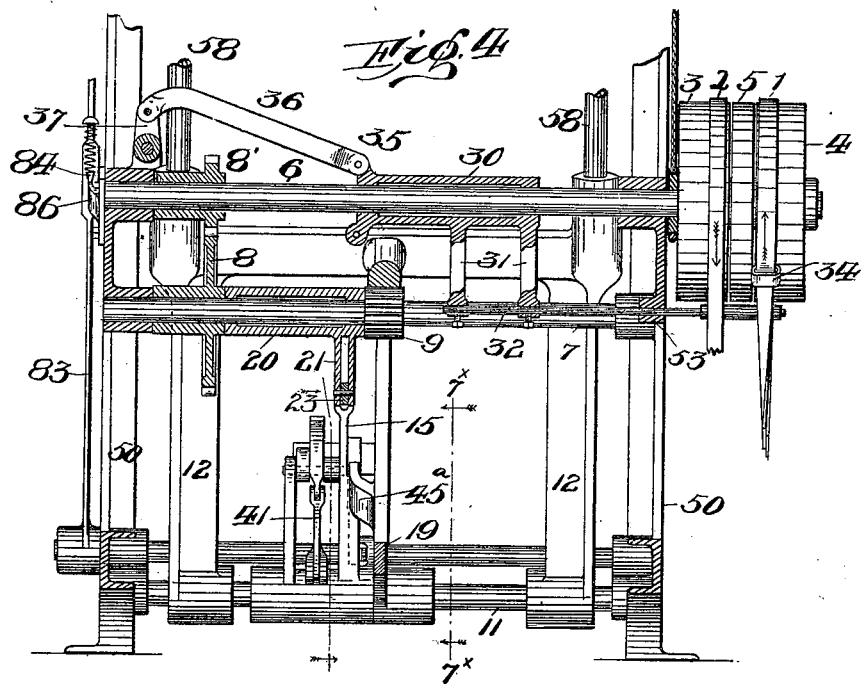
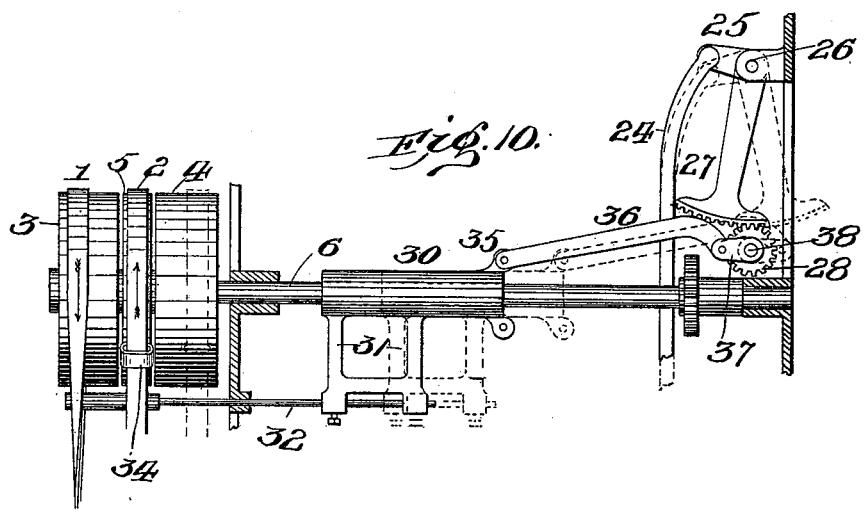
Witnesses.
Thomas Durant
E. Griffith
Inventors:
Arthur T. Hagen and
Daniel M. Cooper.
by Church & Church
their Attorneys.
THE NORRIS PETERS CO., PHOTO-LITHO., WASHINGTON, D. C.

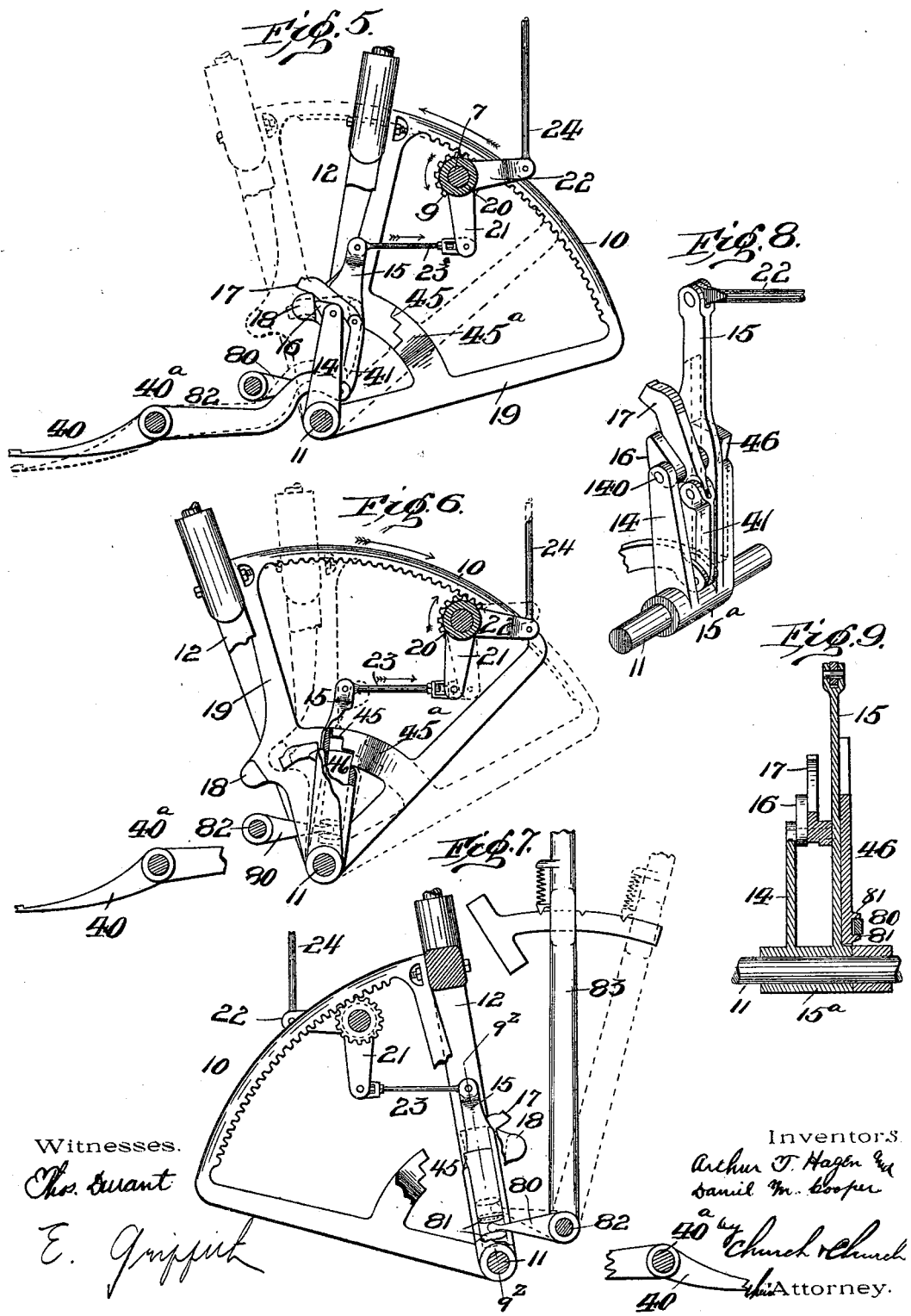

UNITED STATES PATENT OFFICE.

ARTHUR T. HAGEN AND DANIEL M. COOPER, OF ROCHESTER, NEW YORK.

STARCHING-MACHINE.

SPECIFICATION forming part of Letters Patent No. 625,973, dated May 30, 1899.

Application filed November 7, 1898. Serial No. 695,723. (No model.)

*To all whom it may concern:*

Be it known that we, ARTHUR T. HAGEN and DANIEL M. COOPER, citizens of the United States, residing at Rochester, in the county of Monroe and State of New York, have invented certain new and useful Improvements in Starching-Machines; and we do hereby declare the following to be a full, clear, and exact description of our invention, reference being had to the accompanying drawings, forming a part of this specification, and to the figures of reference thereon.

Our present invention has for its object to provide an improved machine for use in laundries and particularly adapted for applying starch or other liquids to garments, such as shirts, preparatory to ironing them, and is particularly adapted to starching bosoms of shirts or articles composed of several plies of material, whereby the starch or liquid may be applied and worked into the garment and the latter will be stretched and so operated upon that wrinkles may be removed and it may be removed in condition to be ironed under any of the ordinary types of ironing-machines.

To this and other ends the invention consists in certain improvements and combinations of parts hereinafter described, and the novel features being pointed out particularly in the claims at the end of this specification.

Figure 1:
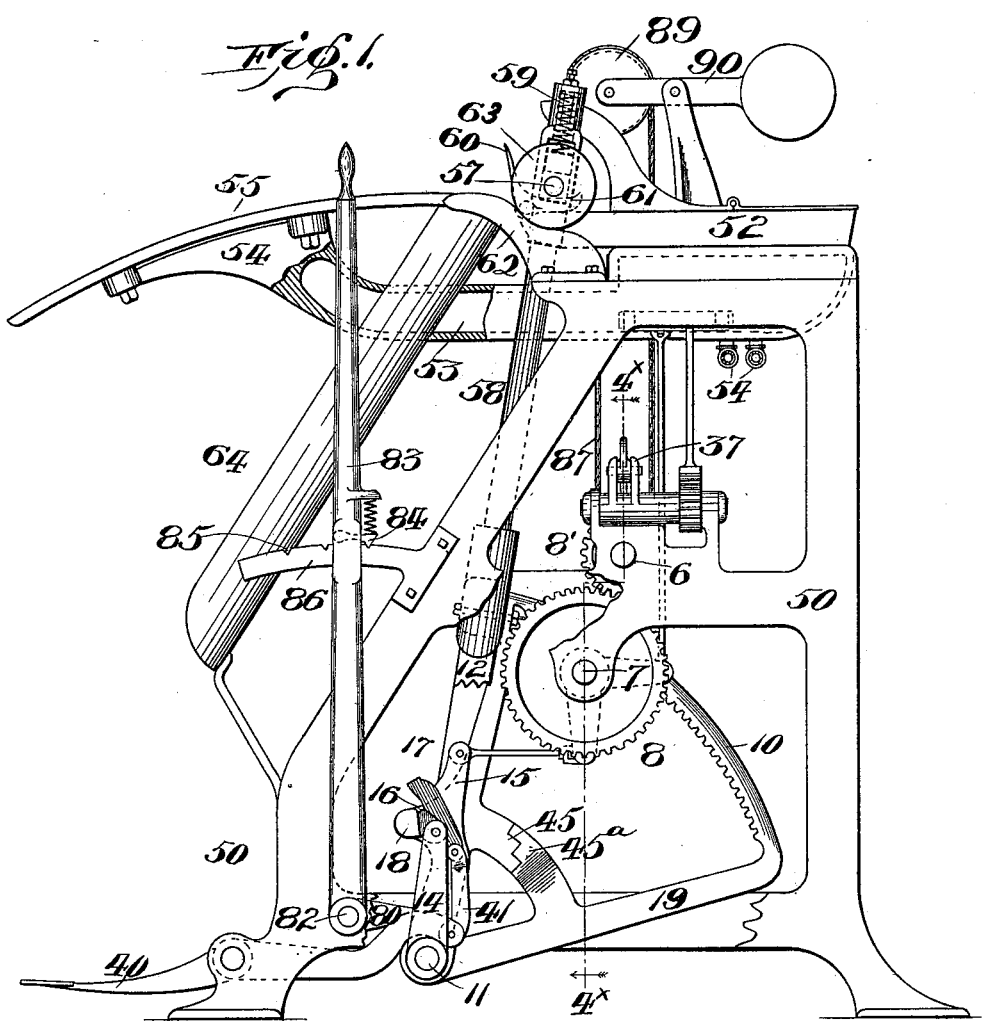
Figure 2:
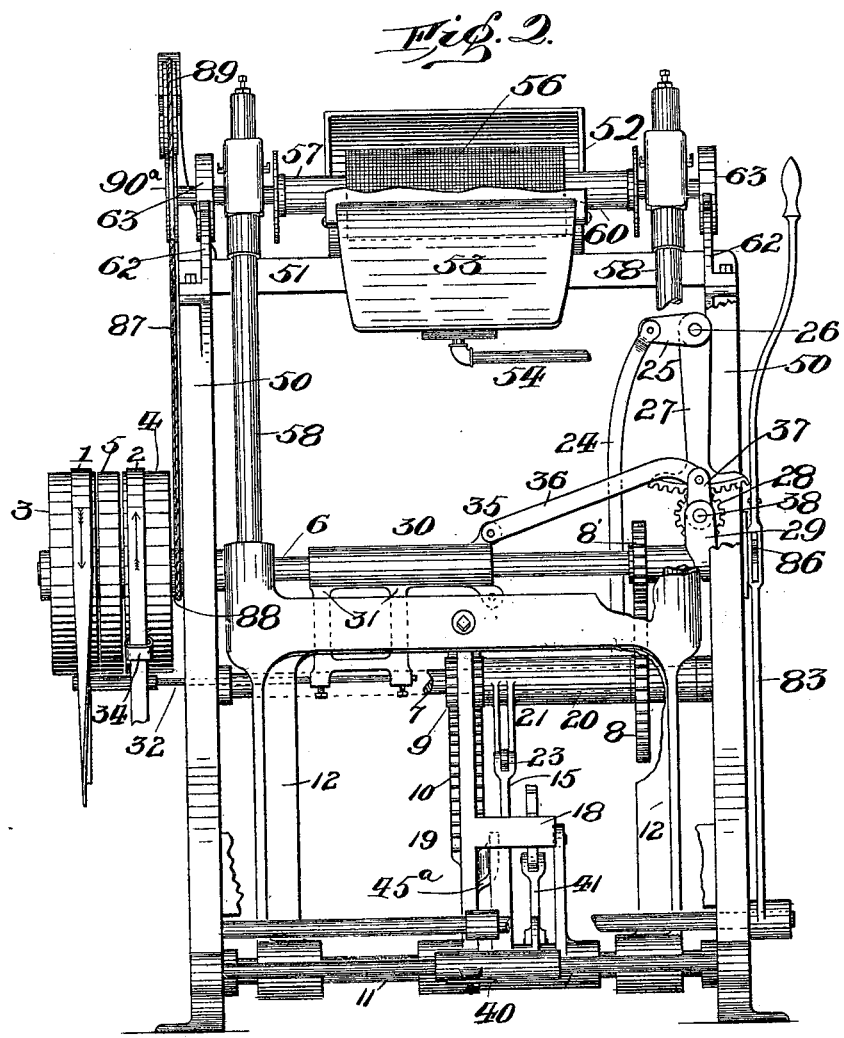

In the accompanying drawings, Figure 1 is a side elevation of a machine constructed in accordance with our invention. Fig. 2 is a front view of the same with the protecting guard or apron removed to show the construction of the parts. Fig. 3 is a plan view. Fig. 4 is a sectional view on the line $4^x\ 4^x$ of Fig. 1. Figs. 5 and 6 are detail views of the roller-operating mechanism. Fig. 7 is a section on the line $7^x\ 7^x$ of Fig. 4; Fig. 8, an enlarged perspective view of the controlling mechanism; Fig. 9, a sectional view taken on the line $9^x\ 9^x$ of Fig. 7; Fig. 10, a view showing the operation of the belt-shifting devices; Fig. 11, a longitudinal section through a portion of the starch-receptacle and the starching-roller operating therein.

Like numerals of reference in the several figures indicate the same parts.

The main frame in the machine consists of the sides or plates 50, connected by suitable cross-bars and at the top by a frame 51, upon which is mounted a starch-receptacle 52 and beneath the latter a steam-chamber 53, connected with suitable steam or hot-water pipes 54, so as to keep the starch or other liquid in proper fluid condition. This chamber 53 is provided with the forwardly-extending arm 54, on which the bed or work-support 55 is mounted, said work-support being preferably curved and left free and unobstructed on all sides, so that a garment, such as a shirt, may be applied to it with the bosom resting upon the upper curved surface.

56 indicates a starch-applying roller, preferably having its surface composed of yielding cellular material, such as rubber, said roller being mounted upon an arbor or shaft 57, mounted in bearings in the upper ends of arms 58, secured to or forming part of an oscillatory frame 12, pivoted upon a shaft 11, arranged in bearings or, if desired, rigidly secured to the lower portion of the sides of the main frame, the frame 12 operating loosely thereon. The bearings for the shaft 57 are pressed downward by springs 59, contained in sockets in the upper ends of the arms 58, so that the starch-roller is held pressed yieldingly upon the goods arranged on the table 55 as said roller is moved over them, and allow for any inequalities in the surface.

The forward edge of the starch-receptacle 52 is located a short distance back of the rear end of the work-support 55, so that articles, such as shirts, may be applied over the work-support, and at the edge of said receptacle is a flap or bridge-piece 60, pivoted to turn down to the position shown in dotted lines in Fig. 11, said flap being secured to bell-crank levers 61 at the ends, as shown in Fig. 11, the arms of said levers being adapted to be operated upon by the shaft 57 of the starch-roller or by the roller itself, the construction being such that when the roller is moved into the starch-receptacle the flap 60 will be lifted, as shown in full lines in Fig. 11, and when the roller is moved out and over the table the flap will be turned down to the position in dotted lines, preventing the starch from dropping and, if desired, affording a support for the starch-roller.

62 62 indicate brackets arranged at the sides of the main frame of the machine, upon which rollers 63 at the ends of the starch-roller operate and which support the starch-roller during its passage from the starch receptacle or tank to the work-support as the starch-roller frame is oscillated on its pivot.

64 indicates an inclined apron or shield arranged beneath the work-support to prevent the contact between the hanging parts, as sleeves of the garment, and the operating parts of the machine beneath the support.

6 indicates the main driving-shaft of the machine, having rigidly secured thereto a driving-pulley 5 and on opposite sides of the latter loose pulleys 3 and 4, around which latter extend driving-belts 1 and 2, moving in opposite directions, as shown particularly in Figs. 2, 4, and 10. 7 indicates a counter-shaft also journaled in the main frame of the machine and arranged, preferably, below the shaft 6 and provided with a gear 8, meshing with a smaller gear 8′, secured to the shaft 6, thereby causing the simultaneous rotation of said shafts. Also rigidly secured to the shaft 7 is a gear 9, coöperating with an internal segmental rack 10, forming part of or secured to a frame 19, which in turn is formed with or secured to the oscillatory frame 12, said segment being formed upon the arc of a circle of which the shaft 11 is the center. The belt-shifter loops 34, through which the driving-belts 1 and 2 operate, are connected to a shipper-rod 32, sliding in a suitable bearing in the main frame and adjustably connected to arms 31 of a sleeve 30, movable longitudinally of the shaft 6, said sleeve being pivoted at 35 to a pitman 36, pivotally connected to a crank 37 on a shaft 38, journaled in a bearing in the main frame, and said shaft 38 being provided with a pinion 28, meshing with a gear-segment 27, pivoted at 26 to the main frame and having an arm 25, to which is attached a downwardly-extending rod 24. From the above it will be seen that by the vertical movement of the rod 24 the belt guides or shifters will be operated so as to bring either the belt 1 or 2 upon the fixed pulley 5, so as to cause the operation of the shaft 6 and the consequent oscillation of the frame carrying the starching-roller in either direction, or when the belts are in the position shown in full lines in Fig. 4 the machine will be at rest.

The rod 24 is connected to an arm 22, formed upon a sleeve 20 loose on shaft 7, said sleeve being also provided with an arm 21, connected by a link or rod 23 with the upper end of a movable shifting member embodying arms 14 and 15, formed upon or secured to a sleeve 15ᵃ mounted loosely on the shaft 11, (shown in Figs. 5 and 8,) and journaled between the arms 14 and 15 is a stud or arbor 140, having a short arm or cam 16 and a longer arm 17, said arms constituting stops, and connected to this arbor and preferably on the side opposite the arm 17 is pivotally connected a link 41, also pivoted to the inwardly-extending end of a lever or treadle 40, journaled at 40ᵃ on a shaft or center on the main frame. The weight of the rear end of the treadle and the operating parts connected thereto is sufficient to hold the stops 16 and 17 projecting upwardly in the position shown in Figs. 1 and 8, so that the end of the cam 16 will not, when in normal position, be in the path of a projection or stop 18, formed upon the frame 19 on the oscillatory frame 12. (See Fig. 5.) The frame 19 is also provided with an arm 45ᵃ, provided with a series of stops or projections 45, arranged at different distances from the shaft 11, (shown in Figs. 5 to 7,) and on one side of the arm 15 of the shifting member is a stop or block 46 sliding vertically on said arm and adapted to be projected into the path of the different stops or projections 45, said stop 46 being movable radially of the shaft 11 by a lever 80, extending between lugs 81, formed on the stop 46. This lever 80 is connected to a shaft 82, to the outer end of which is attached a hand-lever 83, extending upwardly at the side of the work-support in a convenient position to be actuated by the operator. The hand-lever 83 is provided with a spring-pressed pawl 84, frictionally engaging with notches 85, formed in a segment-bar 86, attached to the main frame, so that it will be maintained in any position of adjustment, the notches 85 being arranged relatively to the stops 45 on the segment-frame 19 so that when the catch 84 is in engagement with the notch nearest the main frame the stop 46 will be in position to engage the lowermost of the stops or projections 45, as shown in Fig. 6. This device, embodying the arm 15 and connected parts, constitutes devices for controlling and regulating the extent of movement of the oscillating roller-carrying frame.

87 indicates a belt passing around a pulley 88, preferably connected with the belt-pulley 4, and also extending around a pulley 89, mounted on the end of a counterweighted or tightener lever 90, and upon the end of the arbor 57, carrying the starch-roller, is arranged a pulley 90ᵃ, adapted when the starch-roller is in the receptacle to come in contact with the belt 87 and be rotated thereby, this arrangement serving to stir the starch and supply a sufficient amount to the starch-roller to be conveyed to the goods on the work-support as it moves over the latter.

When the machine is ready for operation, the parts are in the position shown in Fig. 1 with the starch-roller in the receptacle, and the operator having adjusted the garment to be starched upon the work-support places his foot upon the outer end of the treadle 40 and moves it downward. This operation through the link 41 turns the cam 16 down to the position shown in full lines in Fig. 5, thereby moving the arm 15 backward a short distance, rotating the sleeve 20, raising the rod 24, oscillating the sector 27, rotating the shaft 38, and moving the sleeve 30 outward toward the belt-pulleys and shifting the belt 2 onto the fast pulley 5, and thereby causing the rotation of the shaft 7 in a direction to move the frame carrying the starch-roll forward out of the receptacle and over the work-support. When the frame carrying the starching-roll has reached its extreme forward position, one of the stops 45 (the lowermost one in the present instance) will engage the adjustable stop 46 on the arm 15, as shown in Fig. 6, move the arm 15 forward, and through the mechanism described shift the belt 2 back to the pulley 4 and place the belt 1 upon the pulley 5, causing the oscillation of the frame carrying the starch-roller in the opposite direction or toward the rear. If more than one oscillation of the frame is desired, the operator keeps his foot upon the treadle, and as the longer arm 17 is now held in line with the lug 18 on the oscillatory frame the latter will move the arm 15 backward before the roller enters the starch-receptacle again, shifting the belt 2 onto the fast pulley and causing the forward oscillation of the starch-roller. As long as the outer end of the treadle is held pressed downward the longer arm 17 and stop 46, alternately engaging the oscillatory frame, will cause first one belt and then the other to be shifted onto the fast pulley and will move the starching-roller back and forth over the support, but without allowing it to enter the receptacle, and when it is desired to arrest this movement or to allow the roller to enter the receptacle it is only necessary for the operator to lift his foot from the treadle, allowing the weight of the treadle and parts to return the cam 16 and longer arm 17 to the position in Figs. 1 and 8, when both belts will be moved off the fast pulley 5 and the machine brought to rest. It is oftentimes desirable, as when starching shirts having short bosoms, to permit the starching-roller to pass only part way across the work-support, and the length of movement may be regulated by adjusting the handle 83, which will bring the stop 46 in the path described by any one of the stops or projections 45 on the oscillatory frame 19, thereby causing the belts to be shifted before the starching-roller has made a complete movement over the support.

Other means than those herein shown could be employed for controlling and automatically reversing the direction of movement of the starch-carrying roller, and we do not therefore desire to be confined to precisely the construction shown, and belt-shifting devices, while perhaps simpler, are regarded as the mechanical equivalents of clutch devices for causing the reverse movement of the oscillatory frame.

It will be noted that by the manipulation of the hand-lever 83 the machine can either be set before the operation begins, so that the starch-roller will have a short movement, or the operator may during the movement of the roller-frame increase or diminish the extent of its movement over the work-support.

What we claim as new, and desire to secure by Letters Patent, is—

1. The combination with the work-support, an oscillatory frame, and an operating device thereon movable over the support, of reversely-operating driving devices, a movable member for connecting the driving devices with the frame, and adapted to be actuated by the frame, a movable stop or abutment such as arm 16 between the member and frame and under the immediate control of the operator for moving the member to connect one of the driving devices with the frame.

2. The combination with the work-support, an oscillatory frame, and an operating device thereon movable over the support, of reversely-operating driving devices, a movable member for connecting the driving devices with the frame and adapted to be actuated by the frame, two independent and separately-adjustable stops each under the immediate control of the operator and arranged between the member and opposite sides of the frame, whereby the extent of movement of the latter may be varied.

3. The combination with the work-support, an oscillatory frame, and an operating device thereon movable over the support, of reversely-operating driving devices, a movable shifting member for connecting the driving devices with the frame and adapted to be actuated by the frame, adjustable stops arranged between the frame and member, and means under the control of the operator for adjusting said stops while the machine is in operation to vary the extent of movement of the frame.

4. The combination with the work-support, an oscillatory frame, and an operating device thereon movable over the support, of reversely-operating driving devices, a movable shifting member for connecting the driving devices with the frame and adapted to be actuated by the frame, independent adjustable stops between the frame and member, and means for separately adjusting said stops while the machine is in operation to vary the extent of movement of the frame.

5. The combination with the work-support, the oscillatory frame and an operating device thereon movable over the support, of reversely-operating driving devices adapted to be alternately connected to the frame and normally out of operative connection therewith, a movable shifting member operated in opposite directions by the frame when oscillating, a movable stop arranged between the frame and member for positively actuating the latter to connect one of the driving devices with the frame and adapted to be engaged by the frame during its oscillations to connect the latter with one of the driving devices, and means for operating said stop independently of the movement of the frame.

6. The combination with the table or support, the oscillatory frame having the roller thereon movable over the support, of separate driving devices adapted to be connected to the frame for operating the latter in opposite directions, mechanism actuated by the frame for alternately connecting the latter with the driving devices and means under the control of the operator for varying the coöperation of the frame with the last-mentioned connecting devices during the movement of the frame.

7. The combination with the table or support, the oscillatory frame having the roller thereon movable over the support, of separate driving devices for operating the frame in opposite directions, shifting means operated by the frame for alternately connecting the driving devices with the frame and adjustable stops between the shifting means and the frame for varying at will the extent of movement of the latter, and means under the control of the operator for adjusting said stops while the machine is in operation.

8. The combination with the table or support, the oscillatory frame having the roller thereon movable over the support, of reversely-operating driving devices adapted to be alternately connected to the frame, a movable shifting member operated by the frame and controlling the connection of the driving devices with the frame, the movable arms 16 and 17 between the member and frame and means for adjusting them.

9. The combination with the table or support, the oscillatory frame having the roller thereon movable over the support, of separate driving devices for operating the frame in opposite directions, a shifting member operated upon by the frame for alternately connecting the driving devices with the frame, adjustable stops between the frame and shifting member for varying the extent of movement of the frame in both directions and means for independently adjusting said stops during the operation of the machine.

10. The combination with the table or support, the oscillatory frame having the roller thereon movable over the support, of separate driving devices for operating the frame in opposite directions, a shifting member for alternately connecting the driving devices with the frame, the long and short arms arranged between the member and frame, for moving the former in one direction, and adjustable stops between the member and the other side of the frame for regulating the extent of movement of the frame in the other direction.

11. The combination with the table or support, the oscillatory frame having the starch-carrier thereon movable over the support, of separate driving devices for operating the frame in opposite directions, the movable shifting member for alternately connecting the driving devices with the frame, the arms 16 and 17 on the member coöperating with the frame, the treadle connected to the arms, relatively adjustable coöperating stops arranged between the frame and member and means for relatively adjusting said last-mentioned stops to vary the extent of movement of the frame.

12. The combination with the pivoted oscillatory frame having the projections 18 and 45, and separate driving devices for actuating it in opposite directions, of the pivoted shifting member for connecting the driving devices with the frame, and the adjustable stops 17 and 46 mounted thereon.

13. The combination with the oscillatory frame, the belt-pulley connected thereto, the oppositely-moving belts and pulleys therefor, of the belt-shifter, the movable shifter member, connections between the frame and movable member for operating the latter from the former to shift the belts alternately upon the pulley connected to the frame, and means under the immediate control of the operator for regulating the contact of the shifting member with the frame while the machine is in operation.

14. The combination with the pivoted oscillatory frame, and separate driving devices therefor operating in opposite directions, of a movable shifting member for controlling the operation of the driving devices and pivoted upon the center of motion of the frame, the arm 17, and adjustable stop 46 on the member and adapted to contact with the frame, and devices for operating said arm and stop while the machine is in operation.

15. The combination with the pivoted oscillatory frame having the segmental rack, the gear coöperating with the rack and separate oppositely-moving driving devices for actuating the gear in opposite directions, of the movable shifting member for alternately connecting the driving devices with the gear, and adjustable stops under the immediate control of the operator between the frame and shifting member for varying the stroke of the frame while the machine is in operation.

16. The combination with the oscillatory frame having the rack, the gear engaging the rack, the pulley connected to the gear and the separate oppositely-moving belts adapted to coöperate with the pulley, of the movable belt-shifter, and the shifter member connected thereto and actuated by the frame to move the belts alternately upon the gear-pulley.

17. The combination with the oscillatory frame having the rack thereon, the shaft 7 having the gear 9, the shaft 6 having the belt-pulley, and gearing between said shafts 6 and 7, of the oppositely-moving belts, the belt-shifter movable in a plane parallel with that of the shaft 6, the shifting member movable in a plane transversely of the plane of the shaft, connections between the said member and the belt-shifter for operating the latter from the former, said shifting member being operated upon by the oscillatory frame.

18. The combination with the work-support, the receptacle at the end thereof, the oscillatory frame and the roller thereon, coöperating with the support and receptacle, of separate driving devices moving in opposite directions, a movable shifter member for alternately connecting the driving devices with the frame and operated upon by the oscillatory frame, an adjustable stop arranged between the shifter member and frame for causing the reversal of the movement of the latter before the roller enters the receptacle, and means controlled by the operator for moving the stop.

19. The combination with the work-support and the receptacle at the end thereof, the oscillatory frame and the starch-carrier thereon, of separate reversely-operating driving devices for moving the frame in opposite directions, the shifting member for connecting the driving devices alternately with the frame, the stops 16 and 17, the treadle connected to the stops, the stops 45 on the frame, the adjustable stop 46 on the shifter member and the lever for adjusting it.

20. The combination with the work-support, the oscillatory frame, and the operating device thereon movable over the support, of reversely-operating driving devices for actuating the frame, the movable shifter member controlling the driving devices, the movable stop 17 pivoted on the shifter member, the link 41 and the lever 40 for actuating the stop.

21. The combination with the work-support, the oscillatory frame, and the operating devices thereon movable over the support, of reversely-operating driving devices for actuating the frame, the movable shifter member controlling the driving devices and actuated by the frame, the stops 45 on the oscillatory frame, the movable stop 46 sliding on the shifter member, the lever coöperating with the stop 46, and means for securing the lever in adjusted position.

22. In a machine such as described, the combination with a pivoted oscillatory frame 19 having abutments 18 and 45, of the movable member 15, the movable stops 17 and 46 thereon and the levers for adjusting the stops 17 and 46 independently.

23. The combination with the oscillatory frame having the segmental rack, the driving-shaft 6 and the reversely-operating belts, the shaft 7 and gearing between it and shaft 6, of the gear 9 meshing with the segmental rack, the rocking sleeve 20, the sliding sleeve 30, the belt-shifter operated by the sleeve 30, connections between the sleeves for causing their simultaneous operation, and a movable shifter member 15 actuated by the oscillatory frame and connected to the sleeve 20.

ARTHUR T. HAGEN.
DANIEL M. COOPER.

Witnesses:
F. F. CHURCH,
G. WILLARD RICH.